(12) United States Patent
Lu et al.

(10) Patent No.: US 8,541,327 B1
(45) Date of Patent: Sep. 24, 2013

(54) BARIUM OXIDE, CALCIUM OXIDE, MAGNESIA, AND ALKALI OXIDE FREE GLASS

(75) Inventors: Peizhen Kathy Lu, Blacksburg, VA (US); Manoj Kumar Mahapatra, Willington, CT (US)

(73) Assignee: U.S. Department of Energy, Washington, DC (US)

( * ) Notice: Subject to any disclaimer, the term of this patent is extended or adjusted under 35 U.S.C. 154(b) by 27 days.

(21) Appl. No.: 13/278,438

(22) Filed: Oct. 21, 2011

(51) Int. Cl.
*C03C 3/089* (2006.01)
*C03C 3/091* (2006.01)
*C03C 3/083* (2006.01)
*C03C 3/085* (2006.01)
*C03C 3/078* (2006.01)

(52) U.S. Cl.
USPC .......... 501/72; 501/65; 501/66; 501/68; 501/69

(58) Field of Classification Search
USPC .......... 501/15, 65, 66, 68, 69, 72, 73, 77, 501/78
See application file for complete search history.

(56) References Cited

U.S. PATENT DOCUMENTS

| | | | |
|---|---|---|---|
| 3,615,769 A | | 10/1971 | Leitz et al. |
| 3,881,904 A | * | 5/1975 | Stokes et al. ............ 65/43 |
| 4,634,684 A | * | 1/1987 | Dumbaugh, Jr. ............ 501/69 |
| 5,116,789 A | * | 5/1992 | Dumbaugh et al. ............ 501/66 |
| 5,453,331 A | | 9/1995 | Bloom et al. |
| 6,124,224 A | | 9/2000 | Sridharan et al. |
| 6,291,092 B1 | | 9/2001 | Kohli et al. |
| 7,214,441 B2 | * | 5/2007 | Cortright et al. ............ 429/495 |
| 7,521,387 B2 | | 4/2009 | Xue et al. |
| 7,674,735 B2 | | 3/2010 | Badding et al. |
| 2006/0019813 A1 | | 1/2006 | Yoshii |
| 2006/0290257 A1 | | 12/2006 | Heo et al. |

FOREIGN PATENT DOCUMENTS

WO PCT/US10/31185 6/2010

OTHER PUBLICATIONS

Thermophysical properties and denitrification of SrO—La2O3—Al2O3—B2O3—SiO2—based glass sealant for solid oxide fuel/electrolyzer cells; Journal of Power Sources 179 (2008) 106-112.

* cited by examiner

*Primary Examiner* — Noah Wiese
(74) *Attorney, Agent, or Firm* — Michael J. Dobbs; Daniel D. Park; John T. Lucas

(57) ABSTRACT

A glass composition consisting essentially of about 10-45 mole percent of SrO; about 35-75 mole percent $SiO_2$; one or more compounds from the group of compounds consisting of $La_2O_3$, $Al_2O_3$, $B_2O_3$, and Ni; the $La_2O_3$ less than about 20 mole percent; the $Al_2O_3$ less than about 25 mole percent; the $B_2O_3$ less than about 15 mole percent; and the Ni less than about 5 mole percent. Preferably, the glass is substantially free of barium oxide, calcium oxide, magnesia, and alkali oxide.

Preferably, the glass is used as a seal in a solid oxide fuel/electrolyzer cell (SOFC) stack. The SOFC stack comprises a plurality of SOFCs connected by one or more interconnect and manifold materials and sealed by the glass. Preferably, each SOFC comprises an anode, a cathode, and a solid electrolyte.

14 Claims, No Drawings

BARIUM OXIDE, CALCIUM OXIDE, MAGNESIA, AND ALKALI OXIDE FREE GLASS

GOVERNMENT INTERESTS

The United States Government has rights in this invention pursuant to Contract No. DE-FC07-061D14739, between the U.S. Department of Energy (DOE) and Virginia Polytechnic Institute and State University.

CROSS-REFERENCE TO RELATED APPLICATIONS

This application claims priority to PCT Application PCT/US10/31185 filed Apr. 15, 2010, hereby fully incorporated by reference; and U.S. provisional patent application 61/171,897, filed Apr. 23, 2009, hereby fully incorporated by reference.

TECHNICAL FIELD

The present invention relates to a sealing glass, preferably for use in a solid oxide fuel/electrolyzer cell (SOFC) stack.

BACKGROUND ART

The solid oxide fuel/electrolyzer cell (SOFC) is one of the most sought-after technologies for converting chemical energy into electrical energy and producing hydrogen. The chemical energy is supplied by reacting fuel (such as hydrogen) and oxidants (such as air). When consuming pure hydrogen, SOFCs produces no greenhouse gasses. SOFCs can be run in reverse, as an electrolyzer cell, using electricity and steam and producing hydrogen. The produced hydrogen can then be used as an energy source elsewhere.

A SOFC has an anode, a cathode, and a solid electrolyte. The operating temperature of a SOFC is rather high, generally ranging from 600° C. to 900° C. Therefore, ceramic materials are used in SOFC as the solid electrolyte, cathode, and anode. As a single SOFC does not produce enough energy or hydrogen (when run in reverse), they are generally stacked together in a SOFC stack. SOFC stacks require interconnects to transfer fuel, air, and electricity through each cell in the stack. Particularly, the fuel channels and the air channels have to be well sealed from each other to maximize efficiency.

A seal in a SOFC stack ideally must prevent the mixing of fuel and oxidant, prevent the mixing of the fuel and oxidant with the ambient environment, provide mechanical bonding of the components, and provide electrical insulation between the components of the stack.

Fuel cells increase in efficiency as operating temperatures increase. However, at high operating temperatures, the integrity of the cells degrades. Degradation in the SOFC stack causes the fuel, oxidants and other reactant gases to leak and mix, which reduces efficiency and long term stability of the stack.

Glass and glass-ceramic seals are a common seal used in fuel cells. Although inexpensive, current glass and glass-ceramic seals are brittle, and over time degrade. For example, most seals do not have a suitable coefficient of thermal expansion (CTE), resulting in stress fractures in the glass as well as additional stress on other components in the SOFC stack. Current glass and glass-ceramic seals also are known to volatize during operation (e.g. silica, borate, and other alkali metals), which may foul or poison the electrodes and interact in an undesirable manner with other SOFC components.

U.S. Pat. No. 5,453,311 discloses a SrO-alumina-borosilicate sealing glass containing a high amount of $B_2O_3$ and $La_2O_3$ with a coefficient of thermal expansion (CTE) of 8.5-$12*10^{-6}$/° C. in 50-600° C. and glass transition temperature of 500-750° C. However, these glasses are not thermally stable at high operating temperatures, such as 800° C. Since the glass contains a high amount of $B_2O_3$, evaporation of boron oxides may take place, degrading the cells performance as the $B_2O_3$ evaporates, causing the seal to fail.

U.S. Pat. No. 6,291,092 discloses a $B_2O$ free, alkali oxide and BaO sealing glass. However, the presence of alkali oxide decreases the electrical resistance due to the mobility of monovalent cations in the glass. The monovalent cations of the alkali oxides can easily diffuse to the other sealed components in the SOFC Stack, which changes the glass compositions and thus degrades the cell's long term stability. Furthermore, the presence of BaO in the glass reduces both thermal and chemical stability. BaO-containing glasses crystallize near 750° C. to different polymorphs of barium-alumina-silicate phase with different coefficients of thermal expansion (CTE), leading to thermal stress. Moreover, BaO reacts severely with chromium containing metallic interconnects to form $BaCrO_4$, which has about twice the coefficient of thermal expansion (CTE) of the sealing glass and induces cracks in the seal.

Metal brazes, which use a molten metal filler to ensure sealing, are another form of seal used in a SOFC stack. Although easy to manufacture, the brazes are electrically conductive, making them unsuitable for most seals. Few braze metals are compatible with the SOFC operating conditions, and commonly are made of expensive noble metals. There have been efforts to use silver, but its use in both oxidizing and reducing environments can lead to chemical instability.

Therefore, there exists a need for a seal capable of operating in a SOFC stack while preventing the mixing of fuel and oxidant, preventing the mixing of the fuel and oxidant with the ambient environment, providing mechanical bonding of the components, and providing electrical insulation between the components of the stack.

SUMMARY OF INVENTION

A glass composition consisting essentially of: about 10-45 mole percent of SrO; about 35-75 mole percent $SiO_2$; one or more compounds from the group of compounds consisting of $La_2O_3$, $Al_2O_3$, $B_2O_3$, and Ni; the $La_2O_3$ less than about 20 mole percent; the $Al_2O_3$ less than about 25 mole percent; the $B_2O_3$ less than about 15 mole percent; and the Ni less than about 5 mole percent. Preferably, the glass is substantially free of barium oxide, calcium oxide, magnesia, and alkali oxide.

Preferably, the glass is used as a seal in a solid oxide fuel/electrolyzer cell (SOFC) stack. The SOFC stack comprises a plurality of SOFCs connected by one or more interconnects and manifold materials and sealed by the glass. Preferably, each SOFC comprises an anode, a cathode, and a solid electrolyte.

BRIEF DESCRIPTION OF DRAWINGS

Not Applicable

DISCLOSURE OF INVENTION

A glass composition consisting essentially of: about 10-45 mole percent of SrO; about 35-75 mole percent $SiO_2$; one or more compounds from the group of compounds consisting of $La_2O_3$, $Al_2O_3$, $B_2O_3$, and Ni; the $La_2O_3$ less than about 20 mole percent; the $Al_2O_3$ less than about 25 mole percent; the $B_2O_3$ less than about 15 mole percent; and the Ni less than about 5 mole percent. Preferably, the glass is substantially free of barium oxide, calcium oxide, magnesia, and alkali oxide.

In one embodiment, the glass consists essentially of: about 28-30 mole percent SrO; about 5 mole percent $La_2O_3$; about 5 mole percent $Al_2O_3$; about 0-10 mole percent $B_2O_3$; about 50-60 mole percent $SiO_2$; and about 0-2 mole percent of Ni.

In another embodiment, the glass consists essentially of: about 30 mole percent SrO; about 5 mole percent $La_2O_3$; about 5 mole percent $Al_2O_3$; about 0-10 mole percent $B_2O_3$; about 50-60 mole percent $SiO_2$; and about 2 mole percent of Ni.

In yet another embodiment, the glass consists essentially of about 30 mole percent SrO; about 5 mole percent $La_2O_3$; about 5 mole percent $Al_2O_3$; about 0-10 mole percent $B_2O_3$; and about 55-60 mole percent $SiO_2$.

In another embodiment, the glass consists essentially of: about 28-30 mole percent SrO; about 5 mole percent $La_2O_3$; about 5 mole percent $Al_2O_3$; about 58-60 mole percent $SiO_2$; and about 0-2 mole percent of Ni.

In yet another embodiment, the glass consists essentially of about 28-30 mole percent SrO; about 5 mole percent $La_2O_3$; about 5 mole percent $Al_2O_3$; about 58-60 mole percent $SiO_2$; and about 2 mole percent of Ni.

Preferably, the glass is used as a seal in a solid oxide fuel/electrolyzer cell (SOFC) stack comprising a plurality of SOFC modules connected by one or more interconnects and manifold materials and sealed by the glass. Preferably, each SOFC module comprises an anode, a cathode, and a solid electrolyte. Preferably, when used as a seal in a SOFC stack, the glass has a coefficient of thermal expansion (CTE) between $10.5*10^{-6}/°$ C. to $13*10^{-6}/°$ C.; a glass transition temperature greater than 700° C.; and a dilatometric softening temperature greater than 750° C.

Preferably, the glass is substantially free of alkaline oxides. The presence of an alkali oxide reduces the electrical resistivity due to the mobility of monvalent cations in the glass. The monovalent cations of the alkali oxide can easily diffuse to the other sealed components, which changes the glass composition and thus degrades the SOFC's long term stability.

Preferably, the glass is substantially free of BaO. The presence of BaO in the glass reduces both the thermal and chemical stability. BaO based glasses crystallize near 750° C. to different polymorphs of baium-alumina-silicate phases differing in coefficient of thermal expansion (CTE) values sufficiently to develop thermal stress. Moreover, BaO severely reacts with chromium containing metallic interconnects to form $BaCrO_4$, which has about two times the coefficient of thermal expansion (CTE) than that of the sealing glass. The thermal stress increase from the coefficient of thermal expansion (CTE) mismatch induces cracks in the seals that degrade the efficiency and overall integrity of the SOFC stack.

Preferably, the glass is also substantially free of $B_2O_3$, which may evaporate during operation of the SOFC. As $B_2O_3$ evaporates, the glass composition will change and thus degrade the SOFC stack's long term stability.

In one embodiment, the glass is made using conventional glass manufacturing techniques. Preferably, appropriate amounts of the glass ingredients (for example, $SrCO_3$, $La_2O_3$, $Al_2O$, $B_2O_3$, SiO2, Ni) are mixed in a ball mill overnight. The mixed powders are heated in a crucible. Preferably, the mixed powders are heated in a platinum crucible to 1100° C. Preferably, the mixed powders are kept in the crucible long enough for the $SrCO_3$ to decompose, preferably about an hour. The mixture is then further heated into a melt, preferably to 1400° C. for four hours. Preferably, the heating rate is 10° C./min. The melt is then quenched into a mold, preferably a graphite mold. Glass powder having a particle size less than 36 microns can then be prepared by grinding the quenched glass.

Preferably, the glass is made first by grinding SrO and $SiO_2$ into a powder, preferably with the use of a mortar and pestle. Preferably, one or more of $La_2O_3$; $Al_2O_3$; $B_2O_3$; and Ni are also grinded into a powder. Preferably, SrO; $SiO_2$; $La_2O_3$; $Al_2O_3$; and $B_2O_3$ are ground into a powder using a mortar and pestle. The powders are then preferably mixed in a ball mill overnight and melted between 1300° C. and 1400° C. for three to five hours. The melt is then poured in a mold, preferably a graphite mold, to obtain glass.

MODES FOR CARRYING OUT THE INVENTION

Several embodiments of glass were made, as shown in Table 1 below. The weighted oxide powders were mixed in a ball mill overnight and melted at 1400° C. for four hours. The melt was poured in a graphite mold and quenched to obtain glass. The prepared glass samples were each one inch long on average. The following seven (labeled 1-7) compositions were created with the following mole percentages.

TABLE 1

Embodiments of barium oxide, calcium oxide, magnesia, and alkali oxide free glass

| Oxides/composition | 1 | 2 | 3 | 4 | 5 | 6 | 7 |
|---|---|---|---|---|---|---|---|
| SrO (mol. %) | 30 | 30 | 30 | 30 | 30 | 30 | 28 |
| $La_2O_3$ (mol. %) | 5 | 5 | 5 | 5 | 5 | 5 | 5 |
| $Al_2O_3$ (mol. %) | 5 | 5 | 5 | 5 | 5 | 5 | 5 |
| $B_2O_3$ (mol. %) | 10 | 5 | 0 | 5 | 3 | 0 | 0 |
| $SiO_2$ (mol. %) | 50 | 55 | 60 | 53 | 55 | 58 | 60 |
| Ni (mol. %) | 0 | 0 | 0 | 2 | 2 | 2 | 2 |

The coefficients of thermal expansion (CTE), the glass transition temperature ($T_g$), and the dilatometric softening temperature ($T_d$) for the seven glasses were determined as shown in Table 2.

TABLE 2

Thermal properties obtained from the glass embodiments shown in Table 1.

| Composition | $T_g$ (° C.) | $T_d$ (° C.) | CTE ($\times 10^{-6}/°$ C.) |
|---|---|---|---|
| 1 | 685 | 720 | 12.4 |
| 2 | 710 | 765 | 11.69 |
| 3 | 775 | 815 | 11.6 |
| 4 | 705 | 755 | 12.31 |
| 5 | 725 | 770 | 12.41 |
| 6 | 760 | 820 | 11.93 |
| 7 | 760 | 810 | 11.76 |
| 6A | 750 | 805 | 12.99 |
| 7A | 770 | 815 | 10.57 |

A push-rod dilatometer was used to determine the coefficients of thermal expansion (CTE). In the dilatometry experiment, the same heating rate and cooling rate of 3° C./min were employed up to 900° C. for a dwell time of two hours. Coefficients of thermal expansion (CTE) were in the range of 50° C. to glass transition temperature of the corresponding glass sample. The data obtained in the first heating cycle of the glass is not consistent with the remaining cycles. Therefore, the data given in Table 2 do not include data obtained from the first heating cycle. In Table 2, the compositions 6A and 7A indicate the same glass composition as 6 and 7 respectively, but were given a thermal treatment at 900° C. for five minutes.

As shown in Table 2, the coefficients of thermal expansion (CTE) for all prepared glasses are in the range of $10.50*10^{-6}/°$ C. to $13.00*10^{-6}/°$ C. These values match with the coefficients of thermal expansion (CTE) of the solid electrolyte, cathode, anode, interconnect, and manifold materials of a SOFC extremely well. Therefore, once solidified, the glass is well suited as a seal in SOFC stacks as the glass will not degrade over time due to thermal expansion mismatch.

Above the glass transition-temperature ($T_g$), the glass will be in viscous form, whereby no thermal stress will be present to degrade the performance of the SOFC stack. All of the prepared glasses have a glass transition temperature ($T_g$) higher than 650° C., which is sufficient for use as a seal in a SOFC stack. Preferably, the glass is designed for a glass transition at more than 700° C., when used as a seal in a SOFC stack.

The dilatometric softening temperature ($T_d$) is above 700° C. for each of the prepared glasses, which is sufficient to avoid the flow of glass at the operating temperature of the SOFC stack. When used as a seal in a SOFC stack, the dilatometric softening temperature: ($T_d$) is preferably above 750° C., to avoid the flow of glass at operating temperatures of SOFC stack. Since the dilatometric softening temperature ($T_d$) is lower than the cell operating temperature, the glass can be sealed below or at 1000° C. and provide superior bonding to the cell components which will increase the mechanical integrity and overall efficiency. More importantly, the glass embodies a self-healing capability during its softening process to provide a gas tight seal during repeated healing and cooling.

The coefficients of thermal expansion (CTE) for all the prepared glasses are in the range of $10.50 \times 10^{-6}/°$ C.-$13.00 \times 10^{-6}/°$ C. Coefficients of thermal expansion provided are measured up to 50° C.' below the glass transition temperature ($T_g$) of the corresponding prepared glass samples. These values match with the coefficients of thermal expansion (CTE) of electrolyte, cathode, anode, interconnect, and manifold materials of the SOFC stack and similar devices. Therefore, no SOFC stack degradation due to thermal expansion mismatch will occur when the glasses are used as sealing material at temperatures below the glass transition temperature ($T_g$). Above the glass transition temperature ($T_g$), the glasses outlined here will be in viscous form. Therefore, no thermal stress will be present to degrade the SOFC stack.

The thermal stability of the glass was determined by inspecting the devitrification behavior of the glass after heat treatment to each sample at 850° C. for 50-100 hours. No devitrified phase was detected for glasses 2 and 3. In glasses other than glasses 2 and 3, the devitrified phase was detected which is useful to enhance the mechanical strength of the stacks. In glass 7A, the coefficient of thermal expansion (CTE) is $10.57*10^{-6}/°$ C., which is preferred for use in a SOFC stack. Therefore, the devitrified phases are also thermally stable and will not degrade the integrity of the cells due to thermal stress.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

All publications and patent documents cited in this application are incorporated by reference in their entirety for all purposes to the same extent as if each individual publication or patent document were so individually denoted.

Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

The invention claimed is:

1. A glass composition consisting essentially of:
   a. about 28-30 mole percent of SrO;
   b. about 35-75 mole percent $SiO_2$;
   c. a plurality of compounds from the group of compounds consisting of $La_2O_3$, $Al_2O_3$, $B_2O_3$, and Ni;
   d. said $La_2O_3$ less than about 20 mole percent;
   e. said $Al_2O_3$ less than about 25 mole percent;
   f. said $B_2O_3$ less than about 15 mole percent; and
   g. said Ni less than about 5 mole percent.

2. The glass composition of claim 1 further consisting essentially of:
   a. at least some $La_2O_3$; and
   b. at least some $Al_2O_3$.

3. The glass composition of claim 1 consisting essentially of:
   a. about 28-30 mole percent of SrO;
   b. about 5 mole percent $La_2O_3$;
   c. about 5 mole percent $Al_2O_3$;
   d. about 0-10 mole percent $B_2O_3$;
   e. about 50-60 mole percent $SiO_2$; and
   f. about 0-2 mole percent Ni.

4. The glass composition of claim 1 consisting essentially of:
   a. about 30 mole percent of SrO;
   b. about 5 mole percent $La_2O_3$;
   c. about 5 mole percent $Al_2O_3$;
   d. about 0-10 mole percent $B_2O_3$;
   e. about 50-60 mole percent $SiO_2$; and
   f. about 2 mole percent Ni.

5. The glass composition of claim 1 consisting essentially of:
   a. about 30 mole percent of SrO;
   b. about 5 mole percent $La_2O_3$;
   c. about 5 mole percent $Al_2O_3$;
   d. about 0-10 mole percent $B_2O_3$; and
   e. about 55-60 mole percent $SiO_2$.

6. The glass composition of claim 1 consisting essentially of:
   a. about 28-30 mole percent of SrO;
   b. about 5 mole percent $La_2O_3$;
   c. about 5 mole percent $Al_2O_3$;
   d. about 58-60 mole percent $SiO_2$; and
   e. about 0-2 mole percent Ni.

7. The glass composition of claim 1 consisting essentially of:
   a. about 28-30 mole percent of SrO;
   b. about 5 mole percent $La_2O_3$;
   c. about 5 mole percent $Al_2O_3$;
   d. about 58-60 mole percent $SiO_2$; and
   e. about 2 mole percent Ni.

8. The glass composition of claim 1 consisting essentially of:
   a. about 30 mole percent of SrO;
   b. about 5 mole percent $La_2O_3$;

c. about 5 mole percent $Al_2O_3$;
d. about 10 mole percent $B_2O_3$; and
e. about 50 mole percent $SiO_2$.

9. The glass composition of claim 1 consisting essentially of:
   a. about 30 mole percent of SrO;
   b. about 5 mole percent $La_2O_3$;
   c. about 5 mole percent $Al_2O_3$;
   d. about 5 mole percent $B_2O_3$; and
   e. about 55 mole percent $SiO_2$.

10. The glass composition of claim 1 consisting essentially of:
    a. about 30 mole percent of SrO;
    b. about 5 mole percent $La_2O_3$;
    c. about 5 mole percent $Al_2O_3$; and
    d. about 60 mole percent $SiO_2$.

11. The glass composition of claim 1 consisting essentially of:
    a. about 30 mole percent of SrO;
    b. about 5 mole percent $La_2O_3$;
    c. about 5 mole percent $Al_2O_3$;
    d. about 5 mole percent $B_2O_3$;
    e. about 53 mole percent $SiO_2$; and
    f. about 2 mole percent Ni.

12. The glass composition of claim 1 consisting essentially of:
    a. about 30 mole percent of SrO;
    b. about 5 mole percent $La_2O_3$;
    c. about 5 mole percent $Al_2O_3$;
    d. about 3 mole percent $B_2O_3$;
    e. about 55 mole percent $SiO_2$; and
    f. about 2 mole percent Ni.

13. The glass composition of claim 1 consisting essentially of:
    a. about 30 mole percent of SrO;
    b. about 5 mole percent $La_2O_3$;
    c. about 5 mole percent $Al_2O_3$;
    d. about 58 mole percent $SiO_2$; and
    e. about 2 mole percent Ni.

14. The glass composition of claim 1 consisting essentially of:
    a. about 28 mole percent of SrO;
    b. about 5 mole percent $La_2O_3$;
    c. about 5 mole percent $Al_2O_3$;
    d. about 60 mole percent $SiO_2$; and
    e. about 2 mole percent Ni.

* * * * *